(12) United States Patent
Minamisako

(10) Patent No.: US 10,809,954 B2
(45) Date of Patent: Oct. 20, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Yuki Minamisako, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/535,034

(22) Filed: Aug. 7, 2019

(65) Prior Publication Data

US 2020/0241819 A1 Jul. 30, 2020

(30) Foreign Application Priority Data

Jan. 24, 2019 (JP) .................................. 2019-010429

(51) Int. Cl.
*G06F 15/00* (2006.01)
*G06K 15/00* (2006.01)
*G06K 1/00* (2006.01)
*G06F 3/12* (2006.01)
*H04N 1/00* (2006.01)

(52) U.S. Cl.
CPC .......... *G06F 3/1274* (2013.01); *G06F 3/1204* (2013.01); *H04N 1/00411* (2013.01); *H04N 1/00472* (2013.01); *H04N 1/00477* (2013.01)

(58) Field of Classification Search
CPC . G06F 3/1274; G06F 3/1204; H04N 1/00411; H04N 1/00472; H04N 1/00477
USPC ................................ 358/1.14, 1.13, 1.1, 1.15
See application file for complete search history.

(56) References Cited

U.S. PATENT DOCUMENTS

| | | | |
|---|---|---|---|
| 2013/0208299 A1* | 8/2013 | Doui | G06K 15/4095 358/1.14 |
| 2018/0024707 A1* | 1/2018 | Kato | G06F 3/0488 715/810 |
| 2018/0091669 A1 | 3/2018 | Michimura et al. | |

FOREIGN PATENT DOCUMENTS

| | | |
|---|---|---|
| JP | H06-202836 | 7/1994 |
| JP | 3657531 | 6/2005 |
| JP | 2018-056647 | 4/2018 |

* cited by examiner

*Primary Examiner* — Douglas Q Tran
(74) *Attorney, Agent, or Firm* — JCIPRNET

(57) ABSTRACT

An information processing apparatus includes a touch panel and a display. The display displays a predetermined receiving section having a display form that is different between when an unfinished job is not present on the information processing apparatus and when the unfinished job is present on the information processing apparatus. If the predetermined receiving section has received an instruction from a user with the unfinished job not being present, the display displays a predetermined operation item, and if the receiving section has received the instruction from the user with the unfinished job being present, the display displays the predetermined operation item and an operation item that receives an instruction to display the unfinished job.

10 Claims, 12 Drawing Sheets

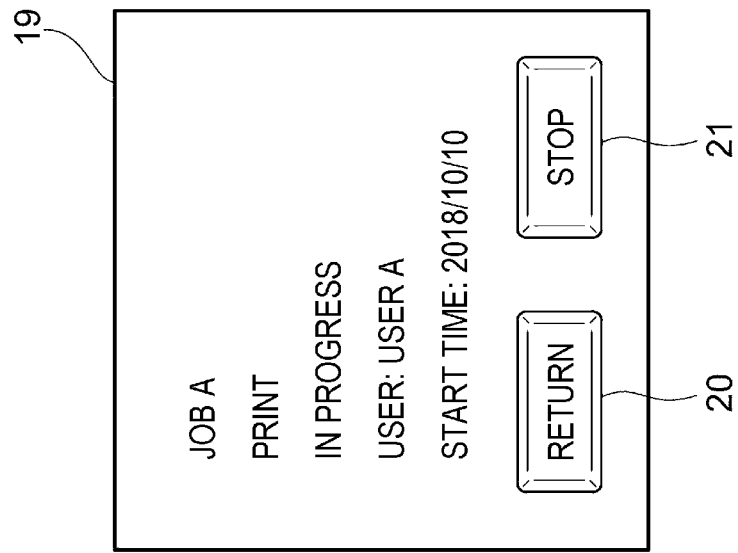

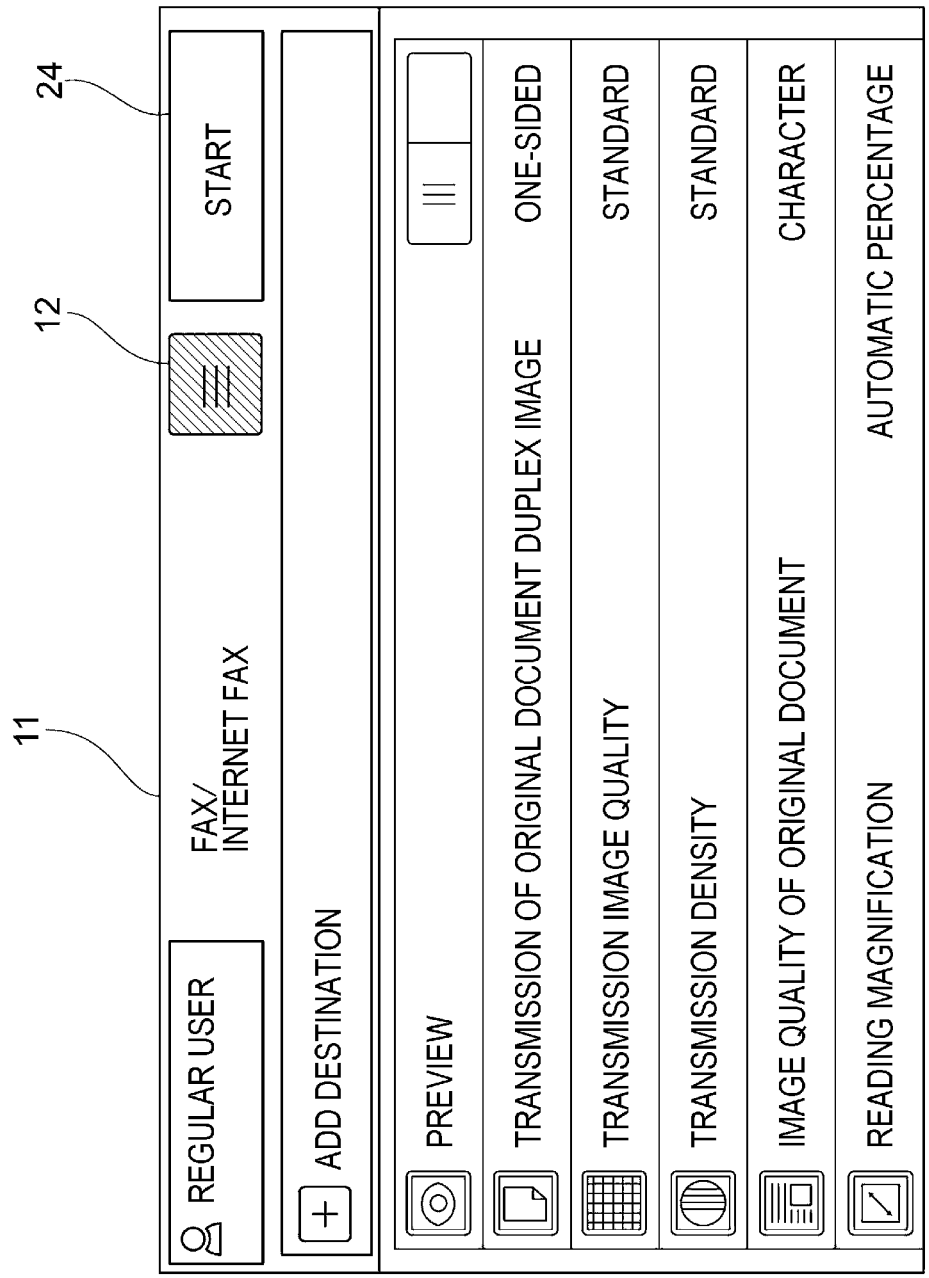

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-010429 filed Jan. 24, 2019.

BACKGROUND

(i) Technical Field

The present disclosure relates to an information processing apparatus and a non-transitory computer readable medium.

(ii) Related Art

Japanese Unexamined Patent Application Publication No. 2018-56647 discloses an image forming apparatus that, not in response to an operation instruction from a user but automatically, popup-displays on a touch panel a piece of information identifying a job in an execution-standby state and a button used to abort the execution of the job.

Touch panels replacing physical keys (hard keys) are currently widely used as an operation screen. An unfinished job may remain on an apparatus, and if information on the unfinished job is displayed not in response to an operation of a user, a portion that has been displayed may be hidden against the user's intention. This presents difficulty for the user to verify the hidden portion and to operate the apparatus.

SUMMARY

Aspects of non-limiting embodiments of the present disclosure relate to notifying a user of the presence of an unfinished job on an apparatus with interference with the operation of the user more controlled than when information on the unfinished job on the apparatus is displayed regardless of the operation of the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus. The information processing apparatus includes a touch panel and a display. The display displays a predetermined receiving section having a display form that is different between when an unfinished job is not present on the information processing apparatus and when the unfinished job is present on the information processing apparatus. If the predetermined receiving section has received an instruction from a user with the unfinished job not being present, the display displays a predetermined operation item, and if the receiving section has received the instruction from the user with the unfinished job being present, the display displays the predetermined operation item and an operation item that receives an instruction to display the unfinished job.

BRIEF DESCRIPTION OF THE DRAWINGS

Exemplary embodiment of the present disclosure will be described in detail based on the following figures, wherein:

FIGS. 8A and 8B illustrate specific examples of the display control process performed by the display controller;

FIG. 11 illustrates another display example of the menu button; and

DETAILED DESCRIPTION

Embodiment of the disclosure is described in detail with reference to the attached drawings.

Figure 1:
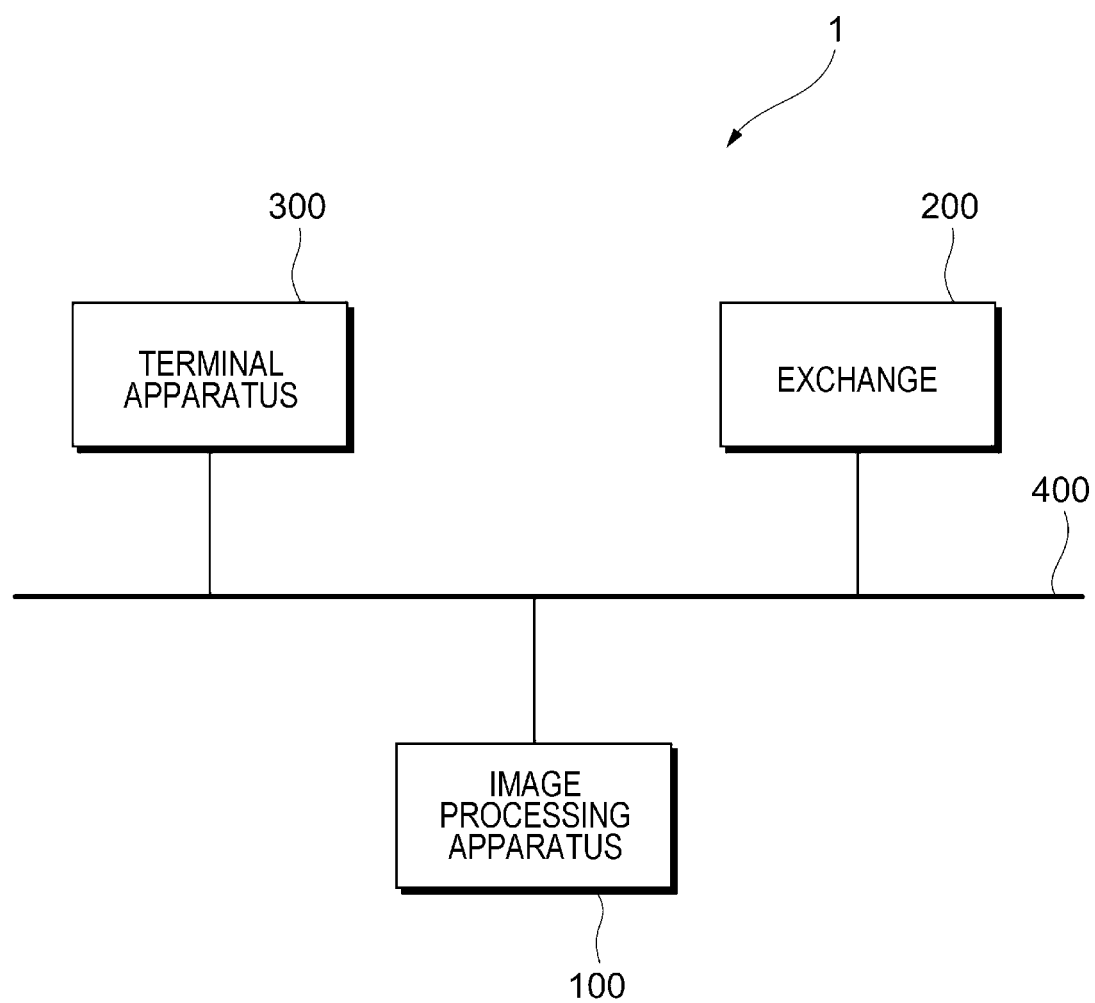
FIG. 1 illustrates the whole configuration of an image processing system of an exemplary embodiment.

FIG. 1 illustrates the whole configuration of an image processing system 1 of the exemplary embodiment. As illustrated in FIG. 1, the image processing system 1 includes an image processing apparatus 100, an exchange 200, and a terminal apparatus 300. The image processing apparatus 100, the exchange 200, and the terminal apparatus 300 are connected to a network 400.

The image processing apparatus 100 has image processing functions including a print function, scan function, copy function and facsimile (hereinafter referred to as fax) function. The image processing apparatus 100 thus performs an image processing process. The image processing apparatus 100 also performs printing by forming an image on a paper sheet in accordance with a print job. The image processing apparatus 100 receives image data via the fax function and prints an image in accordance with the received image data or transmits the image data to the exchange 200.

According to the exemplary embodiment, the image processing apparatus 100 is used as an example of an information processing apparatus.

The print job includes the image data serving as a print target and a control command in which a setting for a print operation is described. The print job is data serving as a unit of an operation for the print function (print operation) performed by the image processing apparatus 100. The data serving as a unit of the operation for a function other than the print function may be a scan job, copy job, or fax job. These jobs may be performed in accordance with a predetermined sequence of order and a job not in progress is in an execution-standby state. The image processing apparatus 100 may be interrupted to perform a job in a predetermined sequence of order or may perform multiple jobs in parallel.

The exchange 200 transmits or receives the image data via a telephone network via the fax function. The exchange 200 receives the image data from the image processing apparatus 100 or transmits the received image data to a destination of the fax function. The exchange 200 receives the image data addressed to the image processing apparatus 100 from another apparatus (not illustrated) or transmits the received image data to the image processing apparatus 100.

The terminal apparatus 300 is a computer that receives information from or transmits information to the image processing apparatus 100. For example, the terminal apparatus 300 transmits a print job to the image processing apparatus 100 or acquires an progress status of each job from the image processing apparatus 100. The terminal apparatus 300 may be a portable information terminal, such as a smart phone or a mobile phone, or a personal computer (PC).

The network 400 serves as a communication medium to be used by each of the image processing apparatus 100, the exchange 200, and the terminal apparatus 300 for information communication. The network 400 may be the Internet, a public telephone network, and/or a local-area network (LAN).

Figure 2:
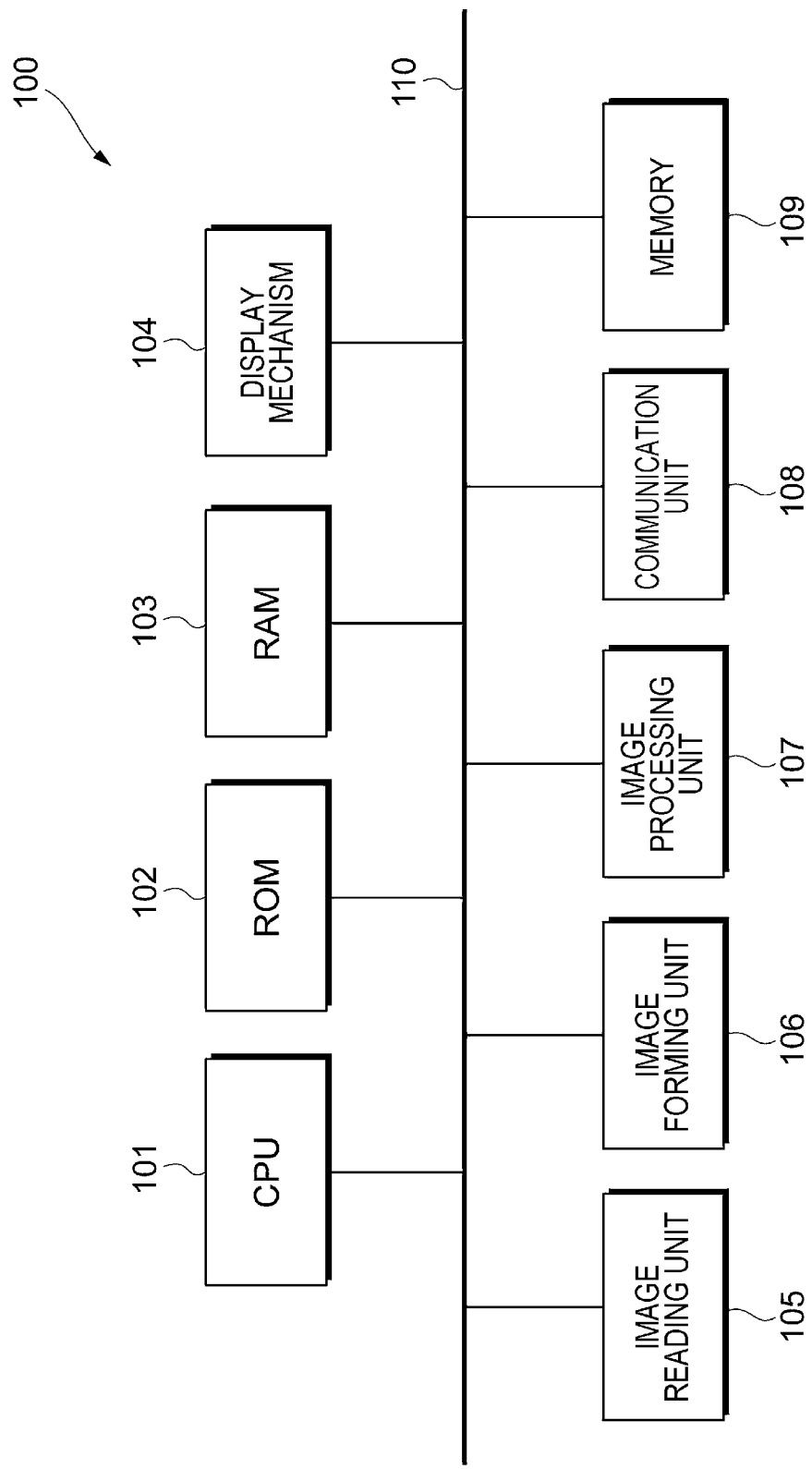
FIG. 2 illustrates the hardware configuration of an image processing apparatus of the exemplary embodiment.

FIG. 2 illustrates the hardware configuration of an image processing apparatus 100 of the exemplary embodiment. The image processing apparatus 100 includes a central processing unit (CPU) 101, read-only memory (ROM) 102, random-access memory (RAM) 103, display mechanism 104, image reading unit 105, image forming unit 106, image processing unit 107, communication unit 108, and memory 109. These elements are connected to a bus 110 and exchange data via the bus 110.

The CPU 101 executes a variety of programs. The ROM 102 stores a control program to be executed by the CPU 101. The CPU 101 reads the control program from the ROM 102 and executes the read control program by using the RAM 103 as a working area. When the CPU 101 executes the control program, a variety of functions are performed by the image processing apparatus 100. In this way, a predetermined display is presented on the display mechanism 104. In addition, an image is formed on a paper sheet or an original document set on the image reading unit 105 is read.

The display mechanism 104 displays a variety of information while receiving an operation performed by a user. The display mechanism 104 includes a display panel, such as a liquid-crystal display, a touch panel mounted on the display panel and detecting a touch made by the user, a physical key pressed by the user, and the like. The display mechanism 104 displays a variety of screens on the display panel and receives an operation performed on the touch panel and the physical key by the user.

An element used to detect a touch includes but is not limited to an element detecting pressure responsive to the touch or an element detecting static electricity of an object touching the touch panel.

In the discussion that follows, the operation in which a finger of the user touches the touch panel is referred to as a touch operation. The touch operation is not limited to the user finger touching the touch panel. For example, the touch operation may be performed by the user who touches the touch panel with a stylus pen.

In accordance with the exemplary embodiment, because of mounting location restrictions of the display mechanism 104, the display mechanism 104 desirably includes no physical keys. For this reason, the image processing apparatus 100 does not include a physical key to display information on a job remaining unfinished (hereinafter referred to as an unfinished job). Because of mounting location restrictions of the display mechanism 104, the display panel of the display mechanism 104 is designed to fit into a predetermined size.

The unfinished job is a job that remains unfinished on the image processing apparatus 100. In other words, the unfinished job is a job that the user may abort on the image processing apparatus 100. Specifically, the unfinished jobs may be a job currently in progress on the image processing apparatus 100, a job waiting on standby (an execution-standby job), and a job in error.

The image reading unit 105 reads an original document and generates the image data representing the image of the read original document. For example, the image reading unit 105 is a scanner. The image reading unit 105 may be a charge-coupled device (CCD) system or a contact image sensor (CIS) system. In the CCD system, a light source radiates a light beam to the original document, a light beam is reflected from the original document, and a CCD receives the reflected light beam via a lens in a contracted form. In the CIS system, a CIS receives a light beam reflected from the original document when the original document is irradiated with a light beam by a light emitting diode (LED).

The image forming unit 106 includes a print mechanism that forms an image on a recording medium, such as a paper sheet. For example, the image forming unit 106 is a printer. The image forming unit 106 uses an electrophotographic system or an ink-jet system. The electrophotographic system forms an image on the recording medium by transferring a toner image on a photoconductor drum to the recording medium. The ink-jet system forms an image on the recording medium by ejecting ink onto the recording medium.

The image processing unit 107 performs image processing on input image data, such as color correction and/or gradation correction. The image processing unit 107 thus generates the image data that has undergone the image processing and then outputs the resulting image data to the image forming unit 106.

The communication unit 108 is connected to a communication network (not illustrated) and functions as a communication interface that performs communication with another apparatus connected to the communication network. For example, if the fax function is performed, the image data obtained when the image reading unit 105 reads the original document is transmitted to another apparatus via the communication unit 108.

The memory 109 includes a memory region, such as a hard disk drive (HDD), and stores data received by the communication unit 108 and/or data generated by the image processing apparatus 100.

Figure 3:
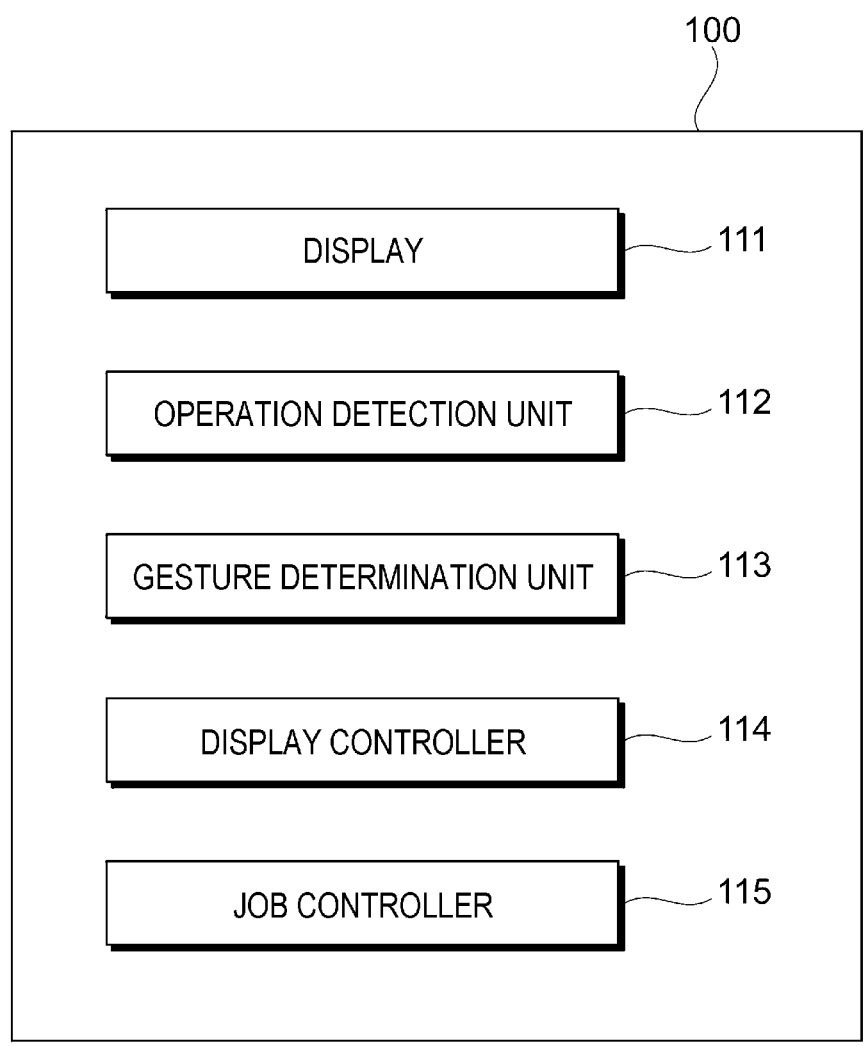
FIG. 3 is a functional block diagram illustrating the functional configuration of the image processing apparatus of the exemplary embodiment.

The functional configuration of the image processing apparatus 100 of the exemplary embodiment is described below. FIG. 3 is a block diagram illustrating the functional configuration of the image processing apparatus 100 of the exemplary embodiment. The image processing apparatus 100 of the exemplary embodiment includes a display 111, operation detection unit 112, gesture determination unit 113, display controller 114, and job controller 115.

The display 111 is a display panel of the display mechanism 104 and displays a variety of screens in response to a control signal output from the display controller 114.

The display 111 displays a home screen displaying a variety of icons indicating the functions enabled on the image processing apparatus 100 and a detail setting screen to make a detail setting for the functions of the image processing apparatus 100 (for example, a detail setting screen used to make a detail setting of a print function).

The operation detection unit 112 detects a touch operation performed on the display 111 by the user and outputs the detected touch operation to the gesture determination unit 113.

When a finger of the user touches the display 111, the operation detection unit 112 detects coordinates of a touched point in a rectangular coordinate system of the display 111 and outputs the coordinates to the gesture determination unit 113. In this case, while the touch operation is performed, the operation detection unit 112 outputs to the gesture determination unit 113 information indicating that the touch operation is currently being performed, location information on the touch location (namely coordinate information) on the display 111, and time information on the time when the touch operation is detected.

Figure 4:
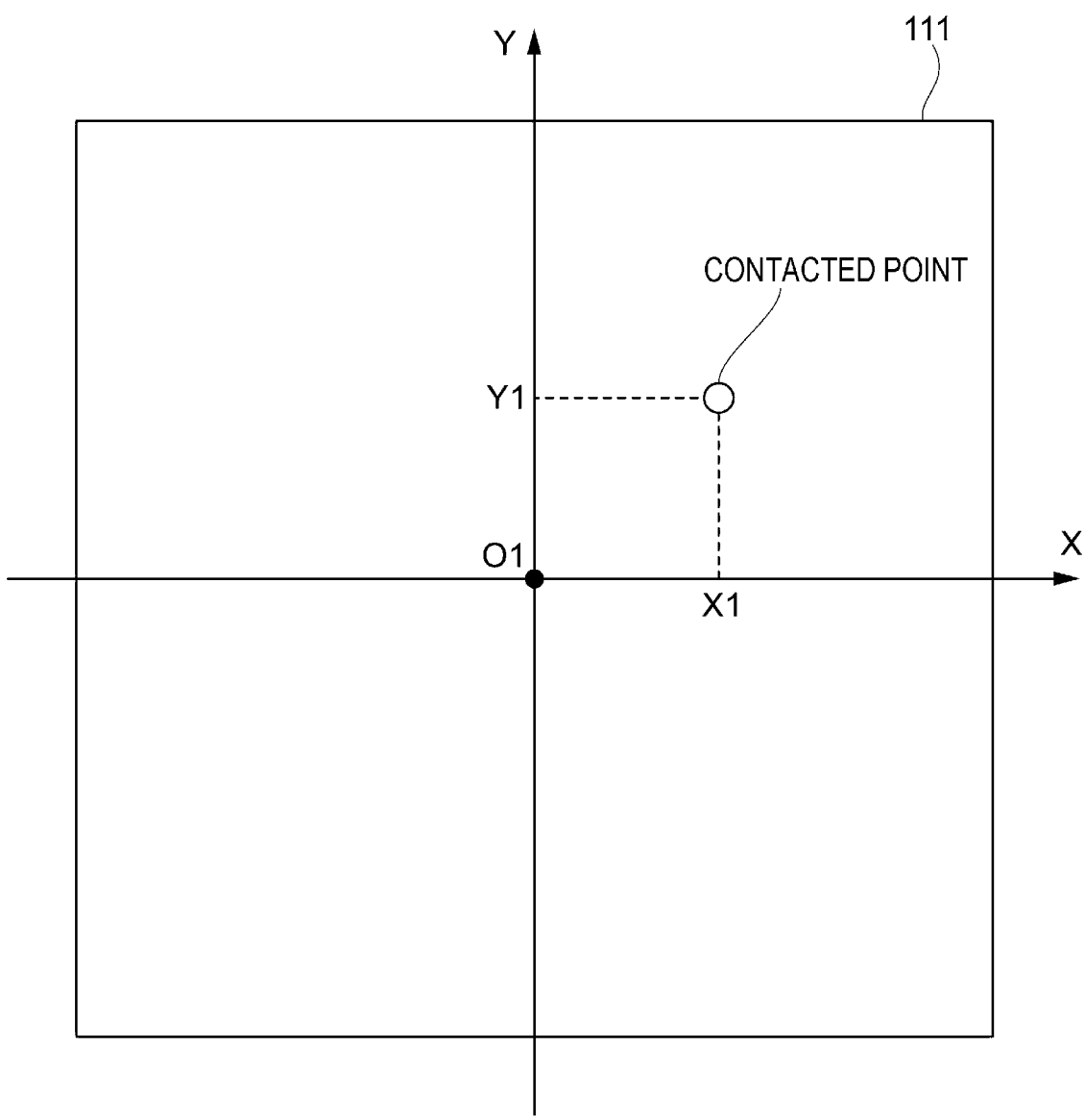
FIG. 4 illustrates an example of coordinates on a display.

FIG. 4 illustrates an example of coordinates on the display 111. Referring to FIG. 4, the rectangular coordinate system is set up in the display 111. The origin O1(0,0) is set to be the center of the display 111, the X axis (the right portion of the X axis is positive) is set to be the horizontal direction of the display 111, and the Y axis (the upward portion of the Y axis is positive) is set to be the vertical direction of the display 111. With respect to the shape of the display 111, the horizontal line represents the X axis and the vertical line represents the Y axis. Each coordinate value is the number of pixels counted from the origin O1. When a finger of the user touches the display 111, the operation detection unit 112 detects X coordinate (X1) of the touched point and Y coordinate (Y1) of the touched point and outputs the coordinates (X1,Y1) to the gesture determination unit 113.

In accordance with the information received from the operation detection unit 112, the gesture determination unit 113 determines the type of the touch operation (namely, a gesture) detected by the operation detection unit 112.

The gesture determination unit 113 determines the touch gesture, such as "tap", "drag", and/or "flick". In the tap, the user briefly touches the surface of the display 111 with one finger. When information indicating a tap gesture is input, the gesture determination unit 113 receives an input that selects a tapped location. For example, if the tap gesture is performed on an icon, the gesture determination unit 113 receives an instruction that has selected the icon. In the drag, the user moves a finger over the screen without losing contact. In the flick, the user quickly brushes the display 111 with one finger.

The display controller 114 generates a control signal controlling the display 111 and controls the displaying function of the display 111. The display controller 114 displays a receiving section (hereinafter referred to as a menu button) that receives an instruction to display a predetermined operation item. The menu button is displayed on each of a variety of screens including a menu screen and a detail setting screen. In accordance with the exemplary embodiment, the predetermined receiving section is the menu button.

The menu button is desirably a non-physical button and is considered a button that implements a function equivalent to the function of a physical key. The gesture that may be performed by using a physical key is thus performed by an operation carried out on the touch panel. The menu button having an integration of multiple buttons is considered to serve as the multiple buttons. A display region used for the screen is thus smaller than in the case where multiple buttons are arranged. The exemplary embodiment is thus applicable to an image processing apparatus 100 having a screen of a smaller size.

The display form of the menu button is designed to be different between when the unfinished job is not present on the image processing apparatus 100 and when the unfinished job is present on the image processing apparatus 100. If an unfinished job remains, the display controller 114 displays in an overlaid mode on the menu button an image indicating that the unfinished job is present (hereinafter referred to as a badge).

If an instruction of the user has been received at the menu button with no unfinished job being present, the display controller 114 displays a predetermined operation item. If an instruction of the user has been received at the menu button with an unfinished job being present, the display controller 114 displays the predetermined operation item and an operation item that receives an instruction to display the unfinished job (hereinafter referred to as a "job verification item").

In accordance with the exemplary embodiment, an example of the image indicating that the unfinished job is present is a badge.

As the process of the image processing apparatus 100 is in progress, a job may be complete and that job may not be an unfinished job any more. The number of unfinished jobs thus decreases. When an instruction for printing or faxing is provided by the user, the number of unfinished jobs increases. Depending on the number of unfinished jobs, the display controller 114 modifies the display content on the screen.

The job controller 115 controls the process of each job performed on the image processing apparatus 100. For example, the job controller 115 performs control to abort an unfinished job selected in accordance with a user operation.

Specifically, if the unfinished job selected is in progress, the job controller 115 performs control to abort the execution of the job. If the job in progress is a print job, the job controller 115 instructs the image forming unit 106 to abort the print process.

If the unfinished job selected is in an execution-standby state, the job controller 115 discontinues the execution-standby state of the job and does not perform the job until a further instruction from the user.

The user may update the setting of the aborted job or re-execute the job again after being aborted. The job controller 115 may also delete the aborted job.

The elements of the image processing apparatus 100 may be implemented by using software and hardware together in cooperation. For example, if the image processing apparatus 100 is implemented by using the hardware configuration in FIG. 2, a variety of programs stored on the ROM 102 and/or the memory 109 are read onto the RAM 103 and then executed by the CPU 101. In this way, the function blocks including the operation detection unit 112, the gesture determination unit 113, the display controller 114, and the job controller 115 are implemented as illustrated in FIG. 3. The display 111 is implemented by using the display mechanism 104.

The display control process of the display controller 114 is described. In the following discussion, the word step may be abbreviated "S".

Figure 5:
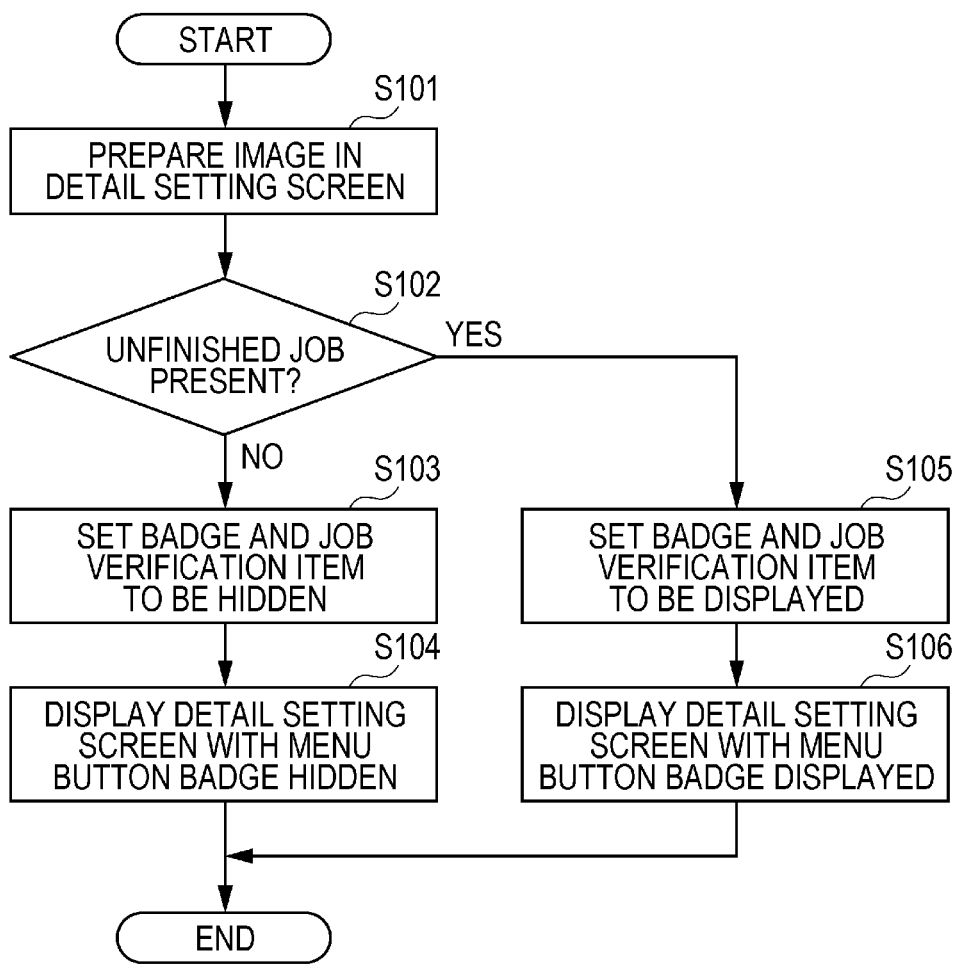
FIG. 5 is a flowchart illustrating of a process that displays a screen including a menu button.

FIG. 5 is a flowchart illustrating of a process that displays a screen including a menu button. An example of the screen including the menu button is a detail setting screen that is used to set detailed setting in the fax function.

The display controller 114 prepares an image included in the detail setting screen (S101). The display controller 114 determines whether an unfinished job remains on the image processing apparatus 100 (S102). If the determination operation in S102 results in a non-affirmative answer (no path), the display controller 114 sets the badge and the job verification item to be in a "hidden" state (S103). The display controller 114 displays the detail setting screen with the badge of the menu button hidden (S104). The job verification item is hidden and even if the user enters an instruction on the menu button, a predetermined operation item is simply displayed. The job verification item continues to be hidden. The routine thus ends.

If the determination operation in S102 results in an affirmative answer (yes path), the display controller 114 sets the badge and job verification item to be displayed (S105). The display controller 114 displays the detail setting screen with the badge and job verification item displayed (S106). The job verification item is set to be displayed now and if the user enters an instruction to the menu button, the job verification item as well as the predetermined operation item is displayed. The process thus ends.

Figure 6:
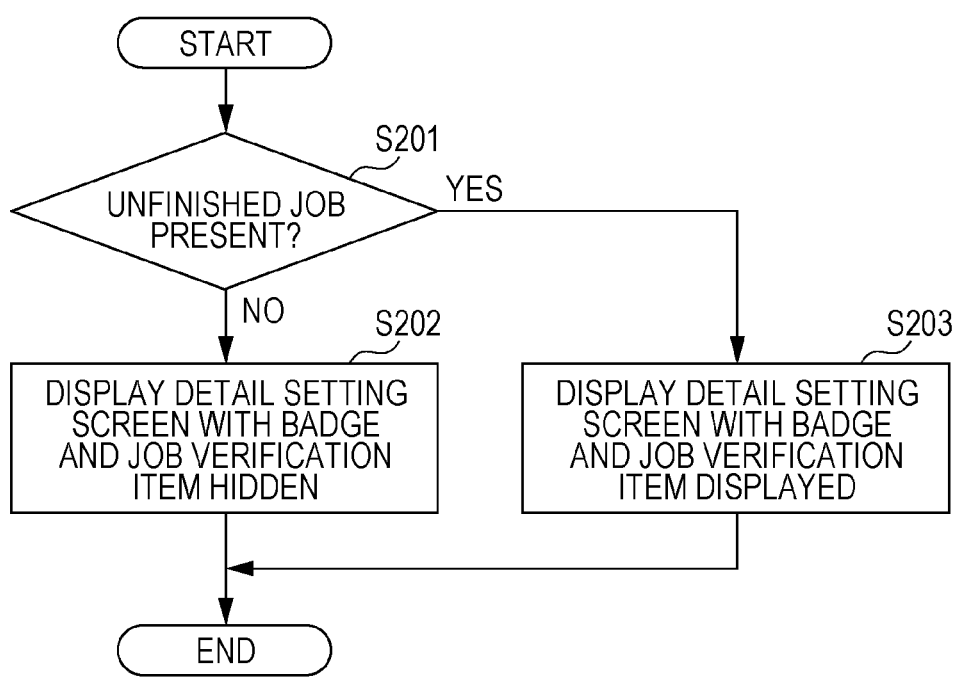
FIG. 6 is a flowchart illustrating a process that modifies a display of a screen in response to a change in the number of unfinished jobs.

FIG. 6 is a flowchart illustrating a process that modifies a display of a screen in response to a change in the number of unfinished jobs. An example of the screen including the menu button is a detail setting screen that is used to set detailed setting in the fax function. The process in FIG. 6 is executed periodically (for example, every 10 milliseconds) after the screen including the menu button is displayed.

The display controller 114 determines whether an unfinished job remains on the image processing apparatus 100 (S201). If the determination operation in S201 results in a non-affirmative answer (no path), the display controller 114 sets the badge and the job verification item to be in a "hidden" state and displays the detail setting screen (S202) If the badge and job verification item are not displayed on the detail setting screen, the detail setting screen continues to be displayed. If the badge and job verification item are displayed on the detail setting screen, the display controller 114 erases the badge and job verification item on the screen to a hidden state. The process thus ends.

If the determination operation in S201 results in an affirmative answer (yes path), the display controller 114 sets the badge and job verification item to be displayed and displays the detail setting screen (S203). If the badge and job verification item are displayed on the detail setting screen, the detail setting screen continues to be displayed. If the badge and job verification item are not displayed on the detail setting screen, the display controller 114 newly displays the badge and job verification item. If the menu button is not selected and the predetermined operation item is not displayed, the job verification item is not displayed. With the menu button selected, the job verification item as well as the predetermined operation item is displayed. The process thus ends.

The display control process of the display controller 114 is specifically described. FIGS. 7A through 8B illustrate specific examples of the display control process performed by the display controller 114. An example of the screen including the menu button is a detail setting screen that is used to set a detailed setting in the fax function.

Figure 7A:
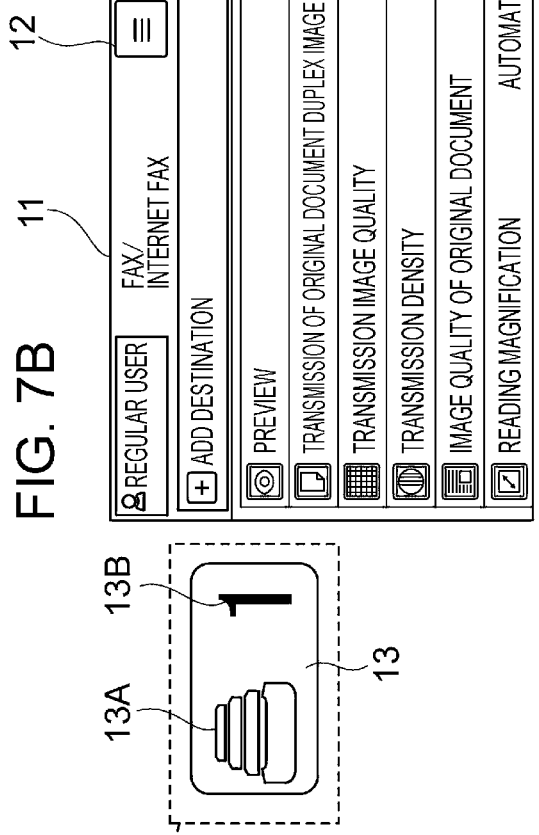
FIGS. 7A through 7D illustrate specific examples of a display control process performed by a display controller.

FIG. 7A illustrates the detail setting screen 11 with the unfinished job present. A start button 24 is used to receive an execution instruction of a job. For example, when a setting of a job is complete, or when the setting of a job that is aborted is modified, the user may execute the job by pressing the start button 24.

Since an unfinished job is present, a badge 13 is displayed in an overlaid mode on a menu button 12.

The badge 13 includes an image 13A corresponding to the job verification item and an image 13B indicating the number of unfinished jobs. Referring to FIG. 7A, the image 13B indicates "1" and thus indicates that one unfinished job is present on the image processing apparatus 100.

Figure 7B:
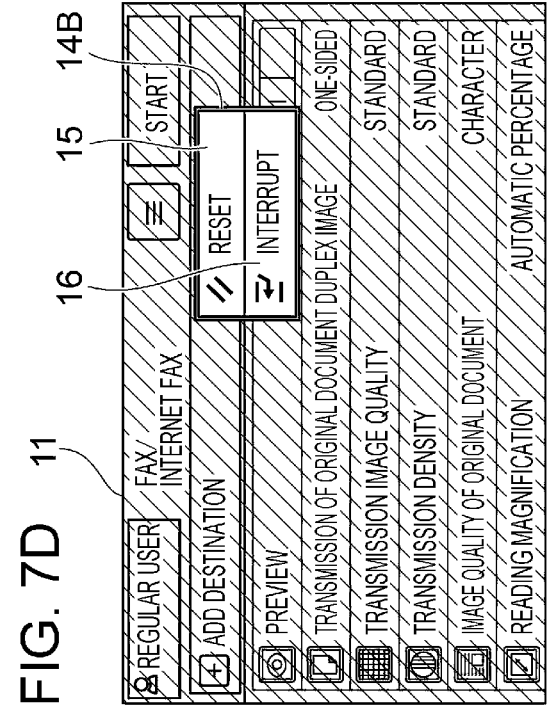

FIG. 7B illustrates the detail setting screen 11 with no unfinished job present. Since no unfinished job is present, the badge 13 is not displayed on the menu button 12.

Figure 7C:
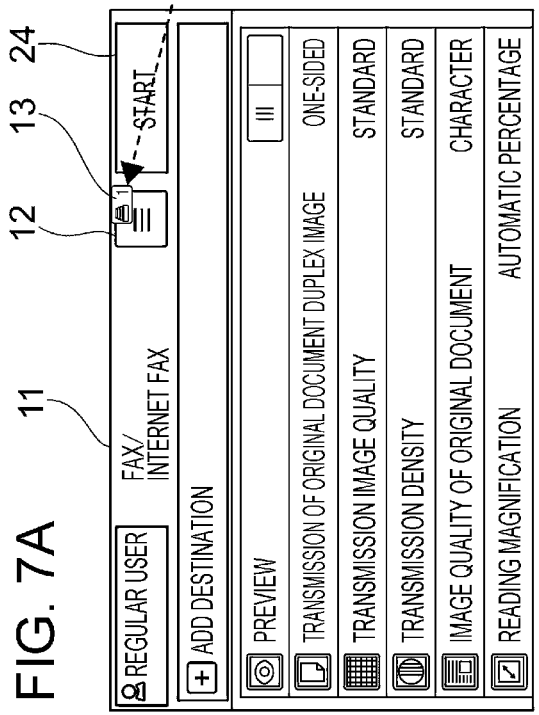

If the user selects the menu button 12 with an unfinished job present (namely, if the user presses the menu button 12 on the detail setting screen 11 in FIG. 7A), an image 14A indicating the job verification item is displayed as illustrated in FIG. 7C. The job verification item as well as the predetermined operation item is displayed. In other words, as in FIGS. 7A through 7C, a "reset" operation item 15 and an "interrupt" operation item 16 are displayed as the predetermined operation items. A "verify-job" operation item 17 is also displayed as the job verification item.

The reset operation item 15 is used to receive an instruction to reset the setting entered on the detail setting screen 11 by the user (for example, to default back to an initial setting). The interrupt operation item 16 is used to receive an instruction to display a screen where a function different from the function set on the detail setting screen 11 (the fax function) is set. The verify-job operation item 17 is used to receive an instruction to display the unfinished job.

An image corresponding to each operation item is displayed at the operation item. The reset operation item 15 displays an image 15A and the interrupt operation item 16 displays an image 16A. The verify-job operation item 17 displays an image 17A corresponding to the job verification item, in other words, the image 17A having the same display content as that for the image 13A included in the badge 13. The image 13A and image 17A are understood as an image indicating the function of the unfinished job.

The verify-job operation item 17 displays an image 17B indicating the number of unfinished jobs, in other words, the image 17B having the same display content as that of the image 13B included in the badge 13.

Even if multiple unfinished jobs are present, the verify-job operation item 17 is displayed as a unique operation item that indicates multiple unfinished jobs. The verify-job operation item 17 is thus understood as the operation item corresponding to the badge 13.

Figure 7D:
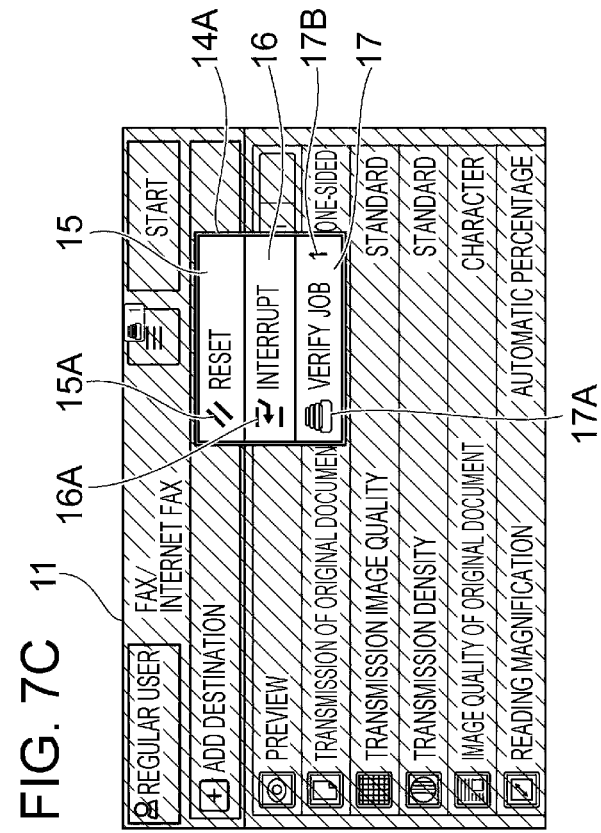

If the user selects the menu button 12 with no unfinished job present (in other words, if the user presses the menu button 12 on the detail setting screen 11 in FIG. 7B), the screen 14B indicating the operation item is displayed as illustrated in FIG. 7D. On the screen 14B, the predetermined operation item is displayed while the job verification item is not displayed. In other words, the reset operation item 15 and the interrupt operation item 16 are displayed while the verify-job operation item 17 is not displayed.

If the user selects the verify-job operation item 17 (in other words, if the user presses the verify-job operation item 17 on the detail setting screen 11 in FIG. 7C), a screen 18 indicating a list of unfinished jobs is displayed as illustrated in FIG. 8A. Referring to FIG. 8A, jobs A through E are present as the unfinished jobs. The jobs A and B are print jobs, the job C is a scan job, and the jobs D and E are fax jobs. The job A as a print job is in progress on the image processing apparatus 100 and the jobs B through E are on standby.

If the user selects the job A, a screen 19 indicating information on the job A is displayed as illustrated in FIG. 8B. If the user presses a "return" button 20 on the screen 19, the screen 19 disappears and the screen 18 is displayed. If the user presses a "stop" button 21, the job controller 115 instructs the image forming unit 106 to abort the printing of the job A.

When the user selects one job to be executed on the screen 18, the job controller 115 may perform control to abort the selected job instead of displaying an image indicating the information on the selected job as illustrated in the screen 19. The user may select multiple jobs on the screen 18 to abort the multiple jobs.

In accordance with the exemplary embodiment as described above, the display controller 114 makes the display form of the menu button look different between when no unfinished job is present on the image processing apparatus 100 and when an unfinished job is present on the image processing apparatus 100. If an instruction from the user is received at the menu button with no unfinished job present, the display controller 114 displays a predetermined operation item. If an instruction from the user is received at the menu button with an unfinished job present, the display controller 114 displays a job verification item as well as the predetermined operation item.

In accordance with the exemplary embodiment, the user is notified of the presence of an unfinished job without the user pressing a physical key to display the information on the unfinished job. If the user selects the job verification item, the information on the unfinished job is displayed.

Other display examples of the badge and job verification item are described.

Figure 9A:
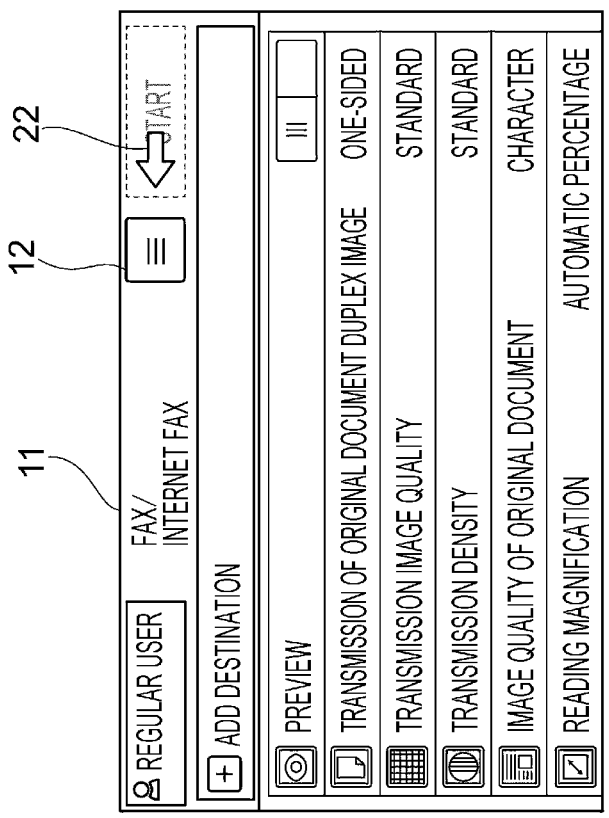
FIGS. 9A and 9B illustrate display examples of a badge.
Figure 9B:
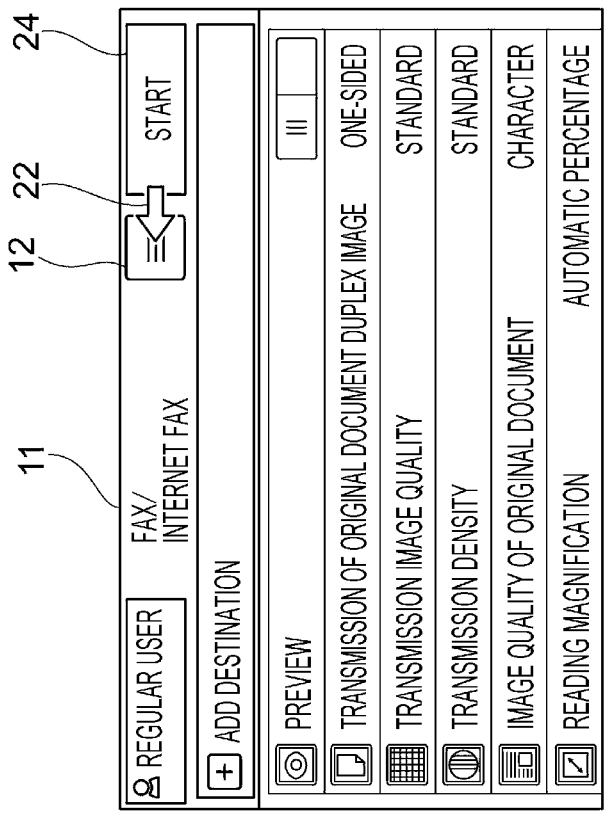

FIGS. 9A and 9B illustrate display examples of the badge. Referring to FIG. 9A, a badge 22 denoted by an arrow mark is displayed in an overlaid manner on the menu button 12 on the detail setting screen 11. The badge 22 is different from the badge 13 in FIG. 7A and does not include the image 13A corresponding to the job verification item and the image 13B indicating the number of unfinished jobs.

Referring to 9B, the badge 22 is displayed on the detail setting screen 11 but is not overlaid on the menu button 12. In other words, the badge 22 is displayed within a predetermined area of the menu button 12.

In accordance with the exemplary embodiment, the badge 22 may simply prompt the user to press the menu button 12 and the image indicating the badge and the display location of the badge are not limited to any particular display content and any particular location, respectively.

Figure 10A:
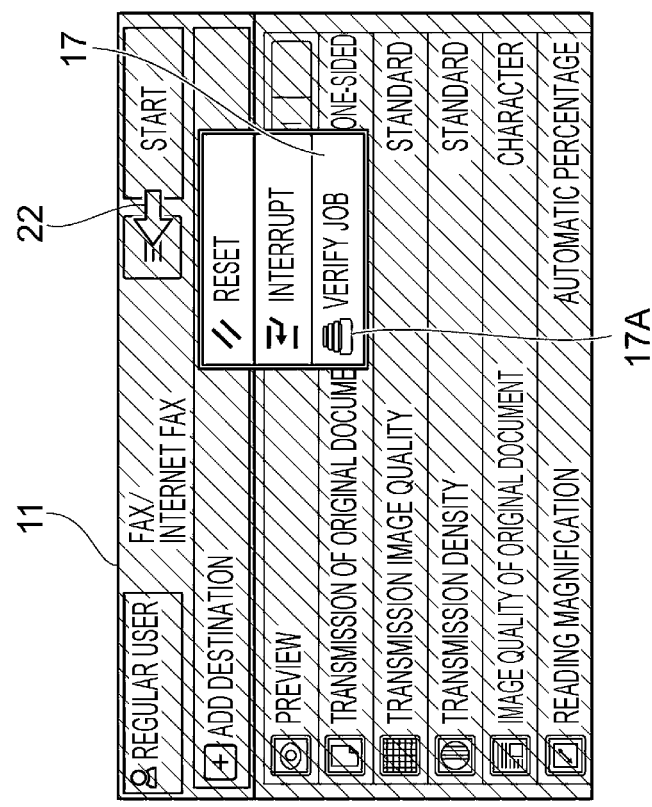
FIGS. 10A and 10B illustrate display examples of job verification items.
Figure 10B:
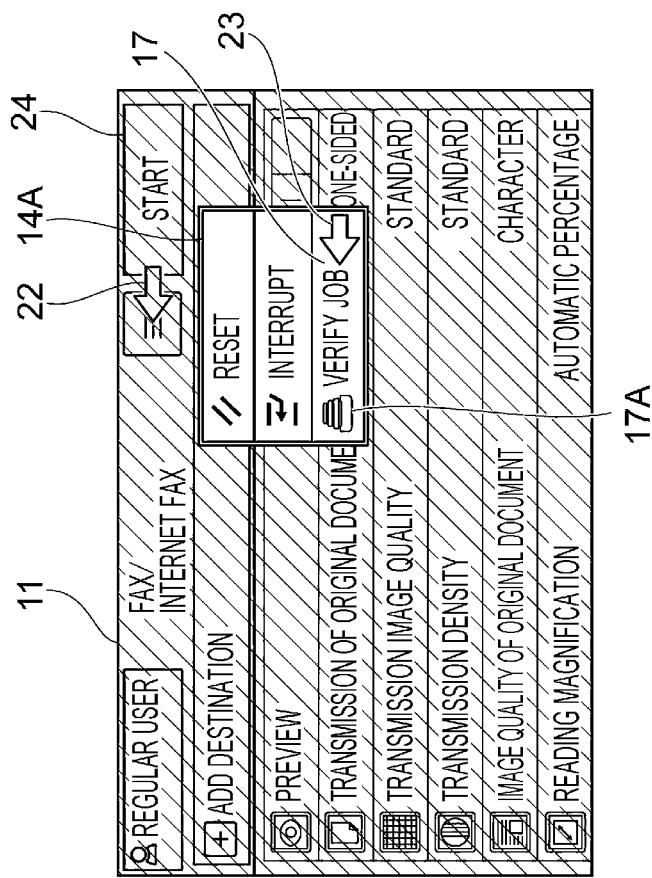

FIGS. 10A and 10B illustrate other display examples of the job verification item. Referring to FIG. 10A, a screen 14A indicating an operation item is displayed on the detail setting screen 11.

The image 14A displays the verify-job operation item 17 which is different from the verify-job operation item 17 in FIG. 7C in that the verify-job operation item 17 in the image 14A does not indicate the number of unfinished jobs. Instead, the verify-job operation item 17 displays an image 23 having the same display content as the badge 22. Referring to FIG. 10B, the verify-job operation item 17 is displayed but the image 23 is not displayed.

In accordance with the exemplary embodiment, the job verification item is simply an operation item that is displayed in addition to the predetermined operation item. Referring to FIGS. 10A and 10B, an image 17A corresponding to a job verification item is displayed. The image 17A may not necessarily be displayed.

In accordance with the exemplary embodiment, the menu button 12 with an unfinished job present may have a display form different from the display form with the badge displayed.

FIG. 11 illustrates another display example of the menu button 12. Referring to FIG. 11, the menu button 12 with a unfinished job present is displayed in color different from the menu button 12 with no unfinished job present.

Referring to FIG. 7B, no unfinished job is present and the menu button 12 is displayed in green color. Referring to FIG. 11, since an unfinished job is present, the menu button 12 is changed in color from green to yellow. The user is notified of the presence of an unfinished job by changing the color of the menu button 12 from the color with an unfinished job present to the color with no unfinished job present. This prompts the user to press the menu button 12.

The change of the display form of the menu button 12 is not limited to the change of the color of the menu button 12. For example, the menu button 12 may be changed in size or shape.

In accordance with the exemplary embodiment, the display forms of the menu button, badge, and job verification item may be modified in response to the number of unfinished jobs.

If the number of unfinished jobs exceeds a predetermined threshold value, the display controller 114 may display the badge in color, size, and shape different from those of the badge with the number of unfinished jobs being equal to or below the predetermined threshold value.

If an instruction is received at the menu button with multiple unfinished jobs present, the display controller 114 displays the verify-job operation item 17 as illustrated in FIG. 7C. If an instruction is received at the menu button with a single unfinished job present, the display controller 114 may display a "stop job" operation item. The stop job operation item is used to receive an instruction to stop an job that is still unfinished.

If the user selects the stop job operation item, a screen indicating information on the unfinished job is displayed on the screen 19 as illustrated in FIG. 8B. If the user presses the stop job operation item, the job controller 115 performs control to stop the execution of the unfinished job.

Also, if the user selects the stop job operation item, the display controller 114 may display a "stop" button instead of displaying the screen indicating the information on the unfinished job. The job controller 115 may perform control such that the execution of the job stops when the user selects the stop job operation item.

If an unfinished job is present in accordance with the exemplary embodiment, the display forms of the menu button, badge, and job verification item may be modified in response to the type of the unfinished job.

For example, the display controller 114 displays badges such that a badge with a predetermined job present is different in color, size, or shape from a badge with no predetermined job present.

For example, the predetermined job is a job that is enabled to set to an emergency stop. Specifically, the predetermined job is a fax job through which the image processing apparatus 100 transmits data, such as an image, to another apparatus. The emergency stop may be triggered in the fax job such that data is not erroneously transmitted to another apparatus. If a fax job is present as an unfinished job, the badge is displayed in different color, different size, or different shape depending on whether the badge is with a fax job present as the unfinished job or with no fax job present.

The predetermined job is not limited to the fax job. For example, an emergency stop may also be used in the print job to control a waste of paper sheets caused by erroneous printing. The predetermined job may thus be a print job.

The display controller 114 may display the image that is different in color, size, or shape depending on whether a predetermined job is present or not as an unfinished job in the job verification item.

The display controller 114 may display the job verification item at a location that is different depending on whether a predetermined job is present as an unfinished job in the job verification item. Specifically, the display controller 114 displays the job verification item closer to the menu button when the predetermined job is present as the unfinished job than when the predetermined job is not present.

If the fax job is present as an unfinished job, the display controller 114 displays the verify-job operation item 17 below the reset operation item 15 and the interrupt operation item 16 as illustrated in FIG. 7C. If the fax job is not present as an unfinished job, the display controller 114 displays the verify-job operation item 17 above the reset operation item 15 and the interrupt operation item 16.

By displaying the job verification item closer to the menu button, the user may more easily select the job verification item after selecting the menu button.

In accordance with the exemplary embodiment, a determination as to whether an unfinished job is present or not is made on the user's own unfinished jobs rather than the unfinished jobs on the image processing apparatus 100.

The user is authenticated by entering a user ID or a password on the display 111 or by holding an integrated card (IC) card, such as an employment pass, over an IC card reader (not illustrated) of the image processing apparatus 100. The successful authentication of the user leads to a login state in which the user has logged in. To display the screen including the menu button, the display controller 114 determines whether an unfinished job generated in response to an operation of a login user (namely, the user's own unfinished job) is present from among the unfinished jobs on the image processing apparatus 100. If the user's own unfinished job is present, the display controller 114 performs control to display the badge and job verification item. If the user's own unfinished job is not present, the display controller 114 performs control not to display the badge and job verification item.

For example, if the administrator of the image processing apparatus 100 has logged in, the display controller 114 determines whether any unfinished job is present among all the jobs on the image processing apparatus 100.

If the user is not authenticated (specifically, if no user has logged in), all the unfinished jobs present on the image processing apparatus 100 may be targeted in the process or only the unfinished jobs generated with no user authentication performed may be targeted in the process.

The image processing apparatus 100 of the exemplary embodiment has been described. The exemplary embodiment may be applied to another apparatus including a touch panel, such as a portable information terminal (like a smart phone or a tablet terminal) or a car navigation system. A computer 500 as a portable information terminal may be substituted for the image processing apparatus 100. The hardware configuration of the computer 500 is described below. The computer 500 is an example of an information processing apparatus.

Figure 12:
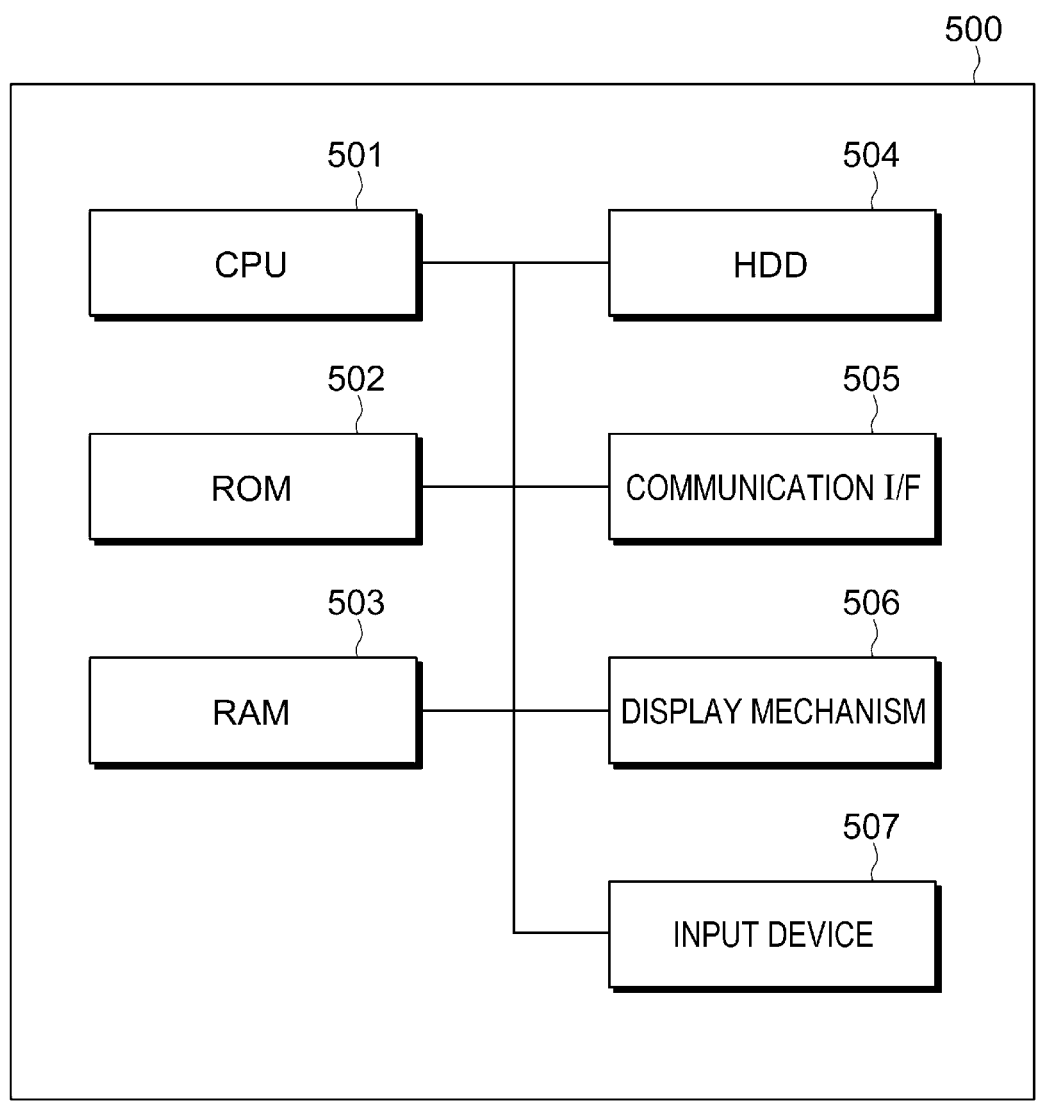
FIG. 12 illustrates the hardware configuration of a computer to which the exemplary embodiment is applied.

FIG. 12 illustrates the hardware configuration of the computer 500 of the exemplary embodiment. Referring to FIG. 12, the computer 500 includes a CPU 501 serving as an arithmetic unit, a ROM 502 serving as a memory region storing a program, such as a basic input output system (BIOS), and a RAM 503 serving as a memory region storing the program. The computer 500 further includes an HDD 504 serving as a memory region storing a variety of programs, such an operating system (OS) and an application, data input to a variety of programs, and data output from the variety of programs. The program stored on the ROM 502 and/or HDD 504 is read onto the RAM 503 and then executed by the CPU 501. The functions of the computer 500 are thus executed.

The computer 500 further includes a communication interface (I/F) 505 used to communicate with an external device, a display mechanism 506, such as a display, and an input device 507 including a keyboard, a mouse, and/or a touch panel.

In the exemplary embodiment, the unfinished job is a print job or a fax job. The unfinished job may be any operation as long as it is still unfinished on the image processing apparatus 100. If the computer 500, such as the portable information terminal or the car navigation system, is used, the unfinished job on the computer 500 is targeted in the process.

In the above discussion, the image processing apparatus 100 does not include a physical key employed to display the unfinished job. Even if a physical key is employed, the exemplary embodiment is still applicable.

The program implementing the exemplary embodiment of the disclosure may be provided not only by using a communication medium but also by using a recording medium, such as a compact disk read-only memory (CD-ROM) having stored the program.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a touch panel and a display,
    wherein the touch panel is mounted on the display to detect a touch operation performed by a user,
    wherein the display displays a predetermined receiving section having a display form that is different between when an unfinished job is not present on the information processing apparatus and when the unfinished job is present on the information processing apparatus, and if the receiving section has received an instruction from the user via the touch panel with the unfinished job not being present, the display changes the display form of the predetermined receiving section into displaying a predetermined operation item, and if the receiving section has received the instruction from the user with the unfinished job being present, the display changes the display form of the predetermined receiving section into displaying the predetermined operation item and an operation item that receives an instruction to display the unfinished job.

2. The information processing apparatus according to claim 1, wherein if the unfinished job is present, the display displays in an overlaid manner on the receiving section an image indicating that the unfinished job is present.

3. The information processing apparatus according to claim 2, wherein the image indicating that the unfinished job is present includes an image indicating a number of unfinished jobs.

4. The information processing apparatus according to claim 3, wherein the image indicating that the unfinished job is present includes the image indicating the number of the unfinished jobs and an image indicating a function used to display the unfinished job.

5. The information processing apparatus according to claim 1, wherein if the unfinished job is present, the display displays an image indicating a number of unfinished jobs at the operation item that receives the instruction to display the unfinished job.

6. The information processing apparatus according to claim 1, wherein if the instruction from the user is received at the receiving section with a plurality of unfinished jobs being present, the display displays a first operation item that receives the instruction to display the unfinished jobs, and if the instruction from the user is received at the receiving section with a single unfinished job present, the display displays, instead of the first operation item, a second operation item that receives an instruction to abort the unfinished job.

7. The information processing apparatus according to claim 1, wherein if the unfinished job is present, the display modifies, in response to a type of the unfinished job, the display form of at least one of the receiving section and the operation item that receives the instruction to display the unfinished job.

8. The information processing apparatus according to claim 7, wherein the display displays closer to the receiving section the operation item that receives the instruction to display the unfinished job when a predetermined job is present as the unfinished job than when the predetermined job is not present.

9. A non-transitory computer readable medium storing a program causing a computer to execute a process for processing information, the process comprising:

displaying a predetermined receiving section having a display form that is different between when an unfinished job is not present on the information processing apparatus and when the unfinished job is present on the information processing apparatus; and with the receiving section having received an instruction from a user with the unfinished job not being present, changing the display form of the of the predetermined receiving section into displaying the predetermined operation item, or with the receiving section having received the instruction from the user with the unfinished job being present, changing the display form of the of the predetermined receiving section into displaying the predetermined operation item and an operation item that receives an instruction to display the unfinished job.

10. An information processing apparatus comprising touch panel means and display means, wherein the touch panel means is mounted on the display means to detect a touch operation performed by a user, wherein the display means displays a predetermined receiving section having a display form that is different between when an unfinished job is not present on the information processing apparatus and when the unfinished job is present on the information processing apparatus, and if the receiving section has received an instruction from the user via the touch panel means with the unfinished job not being present, the display means changes the display form of the predetermined receiving section into displaying a predetermined operation item, and if the receiving section has received the instruction from the user via the touch panel means with the unfinished job being present, the display means changes the display form of the predetermined receiving section into displaying the predetermined operation item and an operation item that receives an instruction to display the unfinished job.

* * * * *